Oct. 4, 1960            F. SIRAKY            2,954,624

SELECTIVE DISPLAY DEVICE

Filed April 18, 1958            3 Sheets-Sheet 1

INVENTOR.
FRANK SIRAKY
BY George B White
ATTY

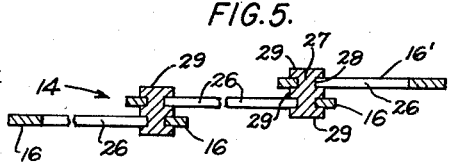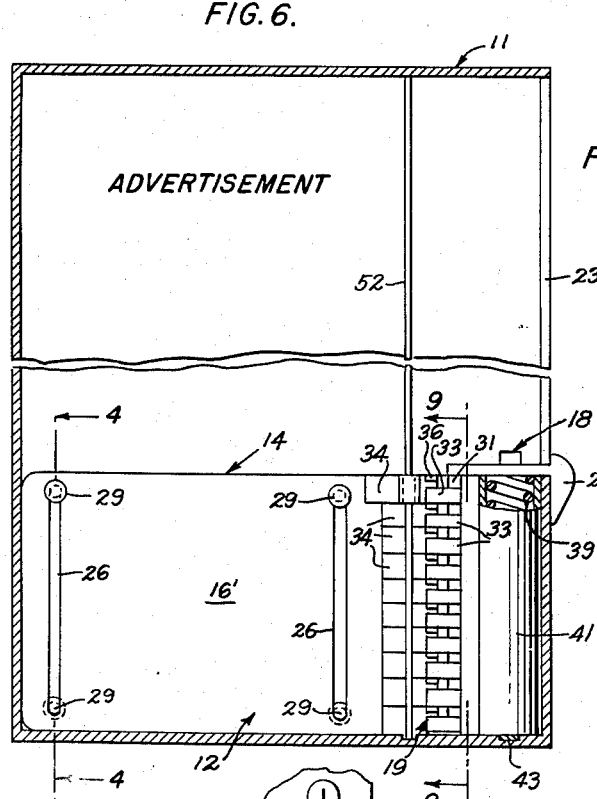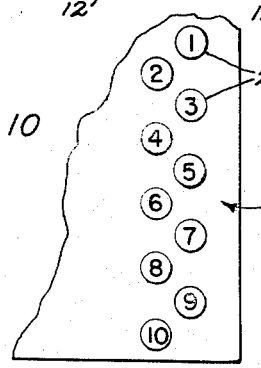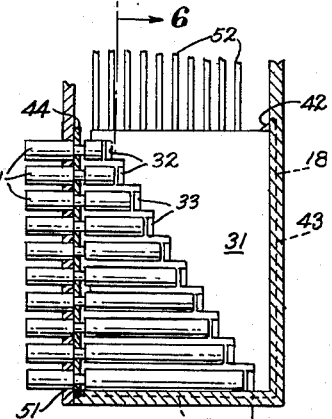

Oct. 4, 1960 F. SIRAKY 2,954,624
SELECTIVE DISPLAY DEVICE
Filed April 18, 1958 3 Sheets-Sheet 3
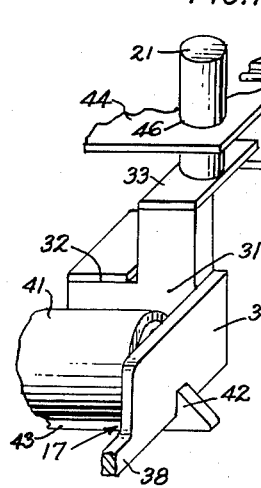
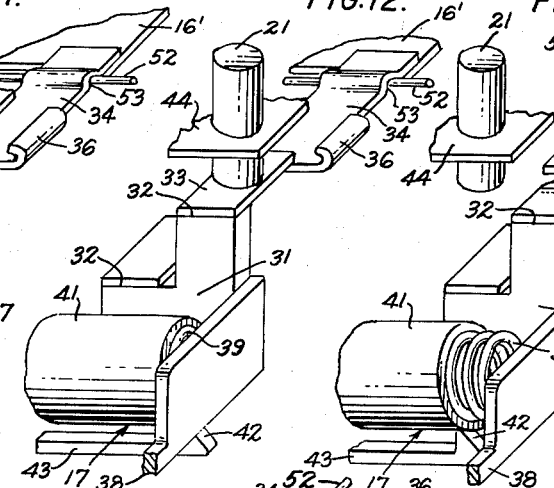
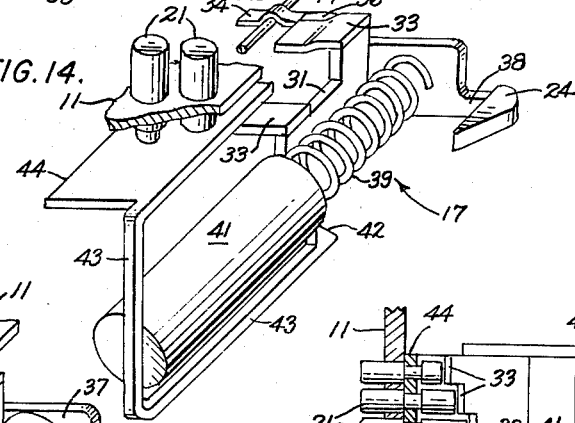
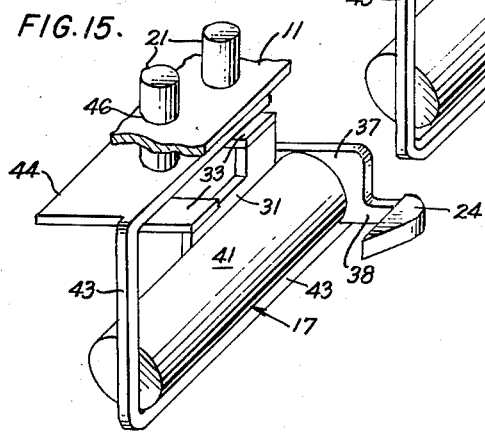
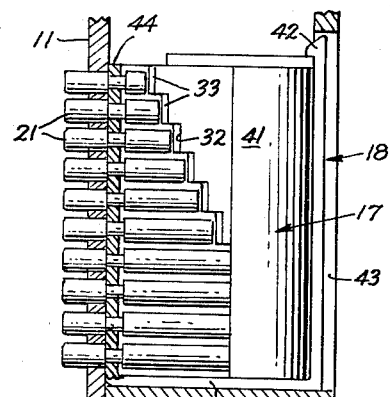
INVENTOR.
FRANK SIRAKY
BY
*George B. White*
ATTORNEY.

United States Patent Office 2,954,624
Patented Oct. 4, 1960

2,954,624
SELECTIVE DISPLAY DEVICE
Frank Siraky, 1100 Fulton St., San Francisco, Calif.
Filed Apr. 18, 1958, Ser. No. 729,413
11 Claims. (Cl. 40—79)

This invention relates to a selective display device.

An object of the invention is to provide a device which contains a plurality of stacked sectional displays, such as charts, maps, pictures or the like, the sections constituting each stack bearing complemental portions or representations which, when exposed in a series, display the selected complete chart or the like; means being provided to selectively expose to view any one of said stacks or series and to hold the sections in stacked position until selected.

Another object of the invention is to provide simple and partly automatic mechanism for selecting and exposing any of a plurality of sectional charts or the like quickly and efficiently.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in accompanying drawings.

With the foregoing and other objects in view, which will be made manifest in the following detailed description, reference is had to the accompanying drawings for the illustrative embodiment of the invention, wherein:

Fig. 4 is a sectional detail of one stack of section sheets.

Fig. 5 is a partly fragmental sectional view of said stack of section sheets extended into an exposed series.

Fig. 6 is a fragmental sectional view of the box frame of my device showing the stacked sheets in relation to the selector device at the magazine.

Fig. 7 is a partly sectional detail view showing the operation of a selector button.

Fig. 8 is a partly sectional detail view showing selector buttons in released position.

Fig. 9 is a fragmental sectional view, the section being taken generally on lines 9—9 of Fig. 6.

Fig. 10 is a fragemntal view of the corner of the box frame where the selector buttons are located, showing the knob of the traveling element in collapsed or stacking position.

Fig. 11 is a fragmental perspective view showing the selector finger disengaged from the finger keeper or engagement element on the leading sheet of the stack.

Fig. 12 is a fragmental perspective view showing the selector finger depressed for selection.

Fig. 13 is a fragmental perspective view showing the selector finger and traveling plate moving the leading sheet from the stack to extended position.

Fig. 14 is a fragmental perspective view showing the selector device and spring moving a leading sheet out of the stack.

Fig. 15 is a fragmental perspective view showing the catch holding the spring compressed.

Fig. 16 is a fragmental partly sectional view showing the catch holding the spring compressed and the traveling device in stacked position.

Figure 1:
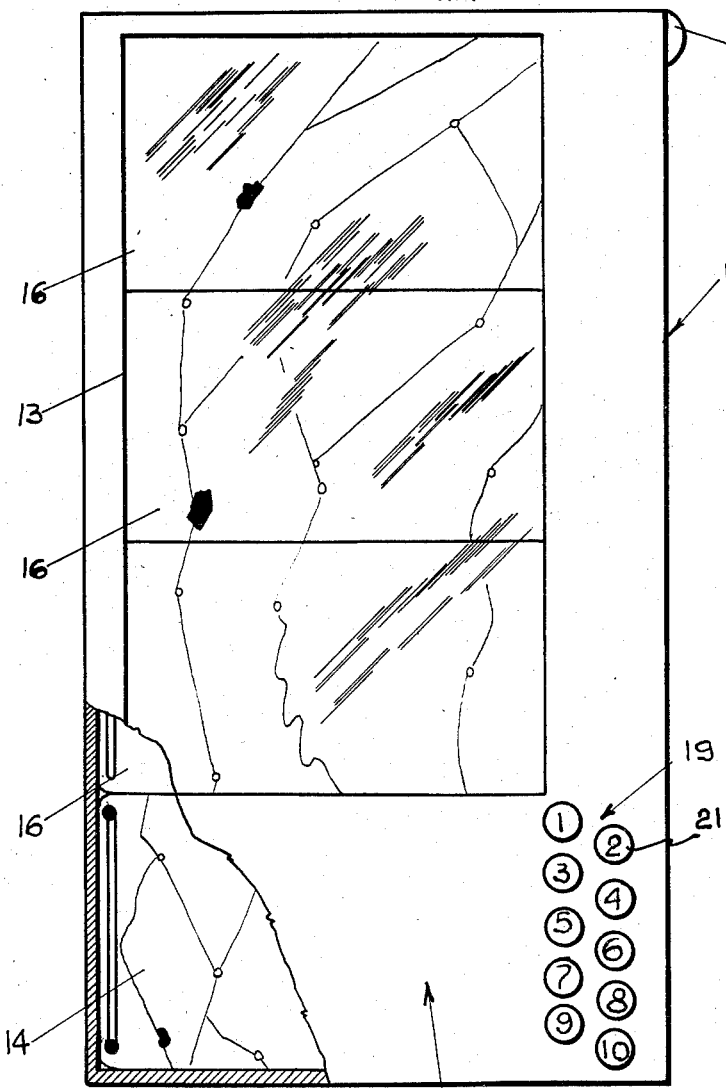
Fig. 1 is a face view of my display device, a corner thereof being broken away to show the stacks stored in the magazine.

In carrying out my invention, I provide a box frame 11 in which is formed a magazine 12 and adjacent and continuous display window 13. In the magazine 12 are contained a plurality of stacks 14 of section sheets 16 adapted to be selectively pulled up and displayed in said window 13. A spring actuated traveling device 17 along a side of the magazine, is held normally inoperative by a catch device 18. A selector device 19 is adapted to selectively connect said traveling device 17 to a selected stack 14 and simultaneously to release the catch device 18, so that the selected series of section sheets 16 is moved along said window 13 and there exposed to view.

The box frame 11, in this illustration, is a comparatively flat box of convenient size to be easily manipulated in an automobile or the like. On its front face is the window 13 which is a suitable opening to accommodate a series of extended section sheets 16 of a stack 14. The window may be covered by suitable transparent covering such as cellophane or the like.

Figure 3:
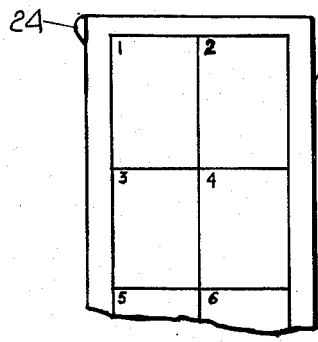
Fig. 3 is a fragmental rear view of the device.

On the rear of the box frame 11 are reproduced in miniature the complete charts, as shown in Fig. 3, which are contained in the device. Each chart so reproduced bears an identification mark, such as a numeral. Corresponding marks or numerals appear on the buttons 21 of the selector device 19 so that a person can make quick identification for selection.

In a side or edge 22 of the box frame, adjacent the buttons 21, is a longitudinal slot 23 to guide a manipulator knob 24 parallel with the window 13 from the magazine 12 to the top of the frame 11.

The magazine 12 is completely inclosed and conceals the stacks 14.

Each stack 14 may have any suitable number of section sheets 16. In the herein illustration, as shown in Figs. 1, 4 and 5, three section sheets 16 form a stack 14. The section sheets 16 are so dimensioned that when extended in series they form a chart of the size of the window 13. The section sheets 16 bear thereon complemental sections or parts of the chart so that when extended along the window they form a single continuous chart.

The adjacent section sheets 16 of each stack are connected by relatively movable spacer and connector elements to correctly align the section sheets in extended position yet allow them to collapse into superimposed relation to form a stack in the magazine. In the herein illustrative embodiment each section sheet 16 has an elongated slot 26 along each edge of the sheet parallel with the direction of movement of the sheets 16. The sheet which is at the top of the window 13 is the, so called, leading sheet 16'. A connecting pin 27 has a reduced neck 28 slidable in the slot 26 of the leading sheet 16' and another reduced neck 28 thereof slidable in the slot 26 of the adjacent middle sheet 16. The three enlarged heads 29 on the connecting pin 27 act as spacers on the opposite sides of and between the adjacent sheets. The same kind of connecting pin 27 is used in both slots 26 of adjacent sheets in each stack. As the leading sheet 16' is pulled out of the stack 14, its slots 26 slide over the pins 27 until the bottom ends of the slots 26 lift the pins 27 and pull the middle sheet 16 out of the stack. The middle sheet 16 in turn pulls its connecting pins 27 up to the upper ends of the slots 26 of the bottom sheet 16 and then lifts the bottom sheet 16 out of the magazine 12. The ends of the respective slots 26 are so spaced from the respective horizontal edges of sheets 16 and 16' that the adjacent horizontal edges of the displays on the adjacent sheets are in registry when the sheets are extended into a series. When the leading sheet 16' is pulled down, the bottom sheet 16 drops into the magazine 12 followed by the middle sheet 16 and then by the leading sheet 16' in proper spaced relation for stacking.

The traveling device 17 for pulling the leading sheet 16', in this illustration, includes a plate 31 positioned transversely in the box frame along one side of the magazine 12 generally under the row of buttons 21. The edge of the plate 31 facing the buttons 21 is formed into staggered steps 32 so that there is a step 32 under each button 21 and the steps 32 are stepped in depth from the front toward the rear of the box frame. A resilient spring finger 33 extends from each step 32 at right angles to the plane of the plate 31. The relation between each button 21 and the adjacent finger 33 is such that about the middle portion of the finger 33 bears against the button 21, as shown in Figs. 9 and 11.

The leading sheet 16' of each stack 14 has a finger engagement element or keeper 34, as shown in Figs. 6, 11, 12 and 13, which consists of a tab extended laterally from the top corner of the leading sheet 16' in general registry but offset beneath the normal level of the spring finger 33. The keeper tab 34 has a keeper hook 36 formed on its top edge beneath the registering finger 33, which hook 36 is curved toward said finger 33 so that when the finger 33 is pressed down by its button 21, as shown in Fig. 12, it can be brought into engagement with the keeper hook 36 when the traveler device is released to move up to the window 13, as shown in Fig. 13.

From the top of the traveling plate 31 extends a lateral flange 37, from which latter extends the neck 38 of the manipulating knob 24. The neck 38 is slidable in the edge slot 23 of the box frame for traveling with the plate 31.

In the present illustration motion is imparted to the traveling device by a coil spring 39 normally compressed in a pocket 41 along said magazine 12 so that the coil spring 39 bears against the plate flange 37 and urges the latter upward along the window 13.

The action of the coil spring 39 is arrested and the traveling device is thus held spring loaded by the catch device 18. The catch device includes a catch hook 42 which hooks over the plate flange 37 when the spring 39 is compressed and the sheets are stacked. The catch hook 42 is on an end of a bar 43 along the pocket 41. The bar 43 is bent along the bottom of the pocket 41 and connects to a releasing plate 44 which extends along the line of buttons 21 between the front wall of the magazine 12 and the spring fingers 33 of the traveling plate 31. The releasing plate 44 has a series of holes 46 therethrough to slidably receive reduced necks 47 of the respective buttons 21. Each button 21 initially may be made of two pieces for the purpose of assembling the buttons 21 in the holes 46 of the releasing plate 44. As a button 21 is pressed in, the upper or outer shoulder 48 of this button 21 presses the releasing plate 44 simultaneously with the pressing of the spring finger 33, thus the catch hook 42 is pushed out of the way of the traveling flange 37 and releases the compression spring 39 for moving the traveling device for spreading the selected section sheets along the window 13. When the knob 24 is pulled down along the side slot 26 to move the leading sheet 16' down into the magazine 12 for stacking, it moves the flange 37 down to compress the spring 39 and moves the traveling plate 31 with it until the finger 33 is withdrawn from the finger keeper hook 36. The released spring finger 33 pushes the selecting button 21 outwardly and the lower shoulder 49 pushes the releasing plate 44 outwardly thereby to move the catch hook 42 over the flange 37 of the traveling plate 31 and thus arrest the device in stacking position and spring loaded for the next selection.

The selector device 19 includes the series of buttons 21 slidable in corresponding holes 51 in the front magazine wall of the box frame. These buttons 21 are related to the respective spring fingers 33 of the traveling plate 31 as heretofore described, for selective engagement with the respective selected keeper hooks 36 on the keeper tabs 34 of the leading sheets 16'.

In order to further assure proper alignment of the complemental section sheets, there is provided for each leading sheet 16' a fixed guide rod 52, as shown in Fig. 9. Each keeper tab 34 has a transverse groove 53 in its underside to ride on the adjacent guide rod 52, as shown in Figs. 6, 11, 12 and 13.

Figure 2:
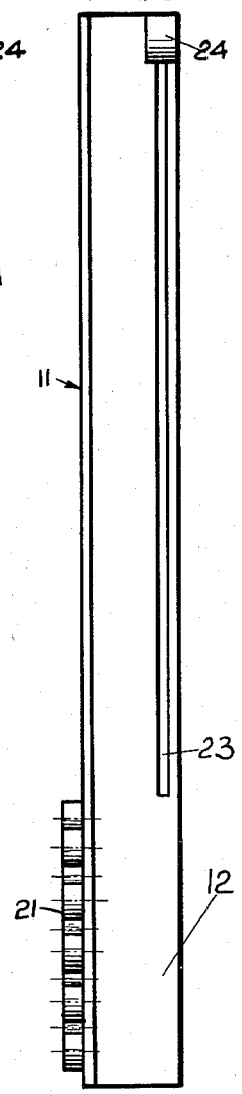
Fig. 2 is a side view of the device.

For operation of the device, suitable objects of display, such as a chart or map, are furnished in separate stacks 14, each stack 14 including a series of section sheets 16, with complemental sectional parts of the chart, connected as heretofore described. These stacks 14 are disposed in the magazine 12 so that the display parts face toward the window 13. The back face of the box frame 11 is suitably marked to identify the available charts and correlate them to the buttons. The operator selects the chart, then pushes the corresponding selector button 21, which depresses the selected spring finger 33 and simultaneously pushes the catch hook 36 out of the way of the traveling flange 37 and releases the spring loaded traveling device. As the traveling plate 31 moves toward the window 13, the depressed finger 33 engages the keeper hook 36 of the leading sheet 16' of the selected chart stack 14 and extends the series of sheets along and opposite the window 13, as heretofore described, and exposes to view the selected chart or map. In order to substitute another chart in sequence, the knob 24 is pulled down along the side slot 26 from the extended position, shown in Figs. 1 and 2, to the collapsed or stacking position shown in Figs. 6 and 15, and pulls down the extended leading sheet 16' and collapses the extended sheets into stack 14 in the magazine 12. As the finger 33 is thus withdrawn from the keeper hook 36, it pushes out the button 21 and the plate 44 so as to move the catch hook 42 over the flange 37 to arrest the spring 39 and the traveling device therewith and thus springload the devices for the next selection.

I claim:

1. In a selective display device for sectional charts, maps and the like, a frame, a magazine on said frame adapted to contain said charts, a display window on said frame adjacent said magazine being adapted for the display of a sectional chart, a plurality of separate stacks of section sheets contained in said magazine, each stack of sheets being movable independently of the other stack, the sheets of each stack being superimposed upon one another and being movable edgewise relatively to one another from the stack into extended position, a leading sheet in each section leading the section sheets of said stack in extending the stack from said magazine to said window, connecting means between adjacent sheets of each stack interengaging said sheets in sequence so that said leading sheet pulls the other sheets of the stack into an extended series at said window, said sheets of each stack bearing complemental sections of a chart to be displayed when said sheets of said stack are extended into a series, a traveling device on said frame for moving a leading sheet into stack extending position, means to engage said traveling device with a selected leading sheet, and a selector device for selecting the engagement between one of said leading sheets and said traveling device.

2. In a selective display device for sectional charts, maps and the like, as defined in claim 1, and means for returning said traveling device so as to stack said selected sheets in said magazine, means to render said traveling device inoperative in said stacking position, and means coacting with said selector device for rendering said traveling device operative simultaneously with said selective engagement with said selected leading sheet.

3. In a selective display device for sectional charts, maps and the like, a frame, a magazine on said frame adapted to contain said charts, a display window on said frame adjacent said magazine being adapted for the display of a sectional chart, a plurality of stacks of section sheets contained in said magazine, each stack having a leading sheet to lead the section sheets of said stack in extending the stack from said magazine to said window, connecting means between adjacent sheets of each stack to cause said sheets to follow said leading sheet into an extended series at said window, said sheets of each stack bearing complemental sections of a chart to be displayed when said sheets of said stack are extended into a series, a travelling device on said frame for moving a leading sheet into stack extending position, means to engage said travelling device with a selected leading sheet, and a selector device for selecting the connection between one of said leading sheets and said traveling device, said traveling device including element reciprocable along said frame from said magazine to and along said window, and said engaging means including a plurality of staggered engagement fingers on said element extended in registry with the respective leading sheets of the stacks in said magazine, a finger engaging member on each leading sheet opposite the registering finger, said selector device selectively engaging a finger with the registering finger engaging member of the selected leading sheet, and means actuated simultaneously with said finger engaging to move said traveling element and the engaged leading sheet to and along said window so as to spread the sectional sheets of the selected stack along said window, and means releasable by said selector actuation to render said moving means inoperative in the sheet stacking position until said selector actuation.

4. In a selective display device for sectional charts, maps and the like, a frame, a magazine on said frame adapted to contain said charts, a display window on said frame adjacent said magazine being adapted for the display of a sectional chart, a plurality of stacks of section sheets contained in said magazine, each stack having a leading sheet to lead the section sheets of said stack in extending the stack from said magazine to said window, connecting means between adjacent sheets of each stack to cause said sheets to follow said leading sheet into an extended series at said window, said sheets of each stack bearing complemental sections of a chart to be displayed when said sheets of said stack are extended into a series, a travelling device on said frame for moving a leading sheet into stack extending position, means to engage said travelling device with a selected leading sheet, and a selector device for selecting the connection between one of said leading sheets and said travelling device, said traveling device including element reciprocable along said frame from said magazine to and along said window, and said engaging means including a plurality of staggered engagement fingers on said element extended in registry with the respective leading sheets of the stacks in said magazine, a finger engaging member on each leading sheet opposite the registering finger, said selector device selectively engaging a finger with the registering finger engaging member of the selected leading sheet, a resiliently yieldable means in said frame urging said traveling element into sheet extending position along said window, a releasable catch device to arrest the moving action of said resiliently yieldable means on said traveling element from said stacked position, and means actuated simultaneously with said finger engaging to release said catch device and free said resiliently yieldable means for moving said traveling element with the engaged selected leading sheet along said window to spread the sheets of the selected stack.

5. In a selective display device for sectional charts, maps and the like defined in claim 3, wherein said selector device includes a series of buttons movable in said frame opposite to and engageable with the respective fingers, each of said fingers being resiliently yieldable so as to normally urge the opposite button into disengaging position, and said means releasable by selector actuation to render said moving means inoperative in sheet stacking position including a catch engaging said moving means in said stacking position, a bar connected to said catch and to said buttons so as to be operated by the manipulation of any selected button for finger engagement to release said catch and render said moving means operative.

6. In a selective display device for sectional charts, maps and the like defined in claim 3, and a guide along said window for each finger engaging member for guiding the respective leading sheet from said magazine generally parallel along said window.

7. In a selective display device for sectional charts, maps and the like, a frame, a magazine formed in said frame, a display window formed on said frame adjacent to said magazine, a plurality of separate stacks of section sheets held in said magazine, each stack of sheets being movable independently of the other stacks, relatively slidable connections between adjacent sheets of each stack to align the respective sheets of said stack and to transmit pull from one sheet to the next sheet for moving said sheets into an extended series, one of the sheets of each stack being a leading sheet as a stack is extended along said window, said sheets of each series bearing complemental sections of said chart to be displayed when said sheets of a selected stack in series are extended from said magazine to said window, a spring actuated device traveling along a side of said frame for extending the sheets of a selected stack from said magazine to said window, normally released connecting device between said spring actuated device and the leading sheet of each stack, and a selector device to selectively connect said spring actuated device to the leading sheet of a selected stack, and simultaneously to actuate said spring actuated device for extending the series of sheets of the selected stack, and means for simultaneously collapsing the extended series of sheets into a stack in said magazine and arresting and spring loading said spring actuated device in said magazine for said travel.

8. In a selective display device for sectional charts, maps, and the like, as defined in claim 7, wherein said relatively slidable connections include slots at the adjacent ends of said stacked sheets, spacer elements extended through registering slots of adjacent sheets, and spaced heads on said spacer elements for retaining said elements in the respective slots and spacing the respective adjacent sheets for stacking.

9. In a selective display device for sectional charts, maps and the like, a frame, a magazine formed in said frame, a display window formed on said frame adjacent to said magazine, a plurality of separate stacks of section sheets held in said magazine, each stack of sheets being movable independently of the other stacks, relatively slidable connections between adjacent sheets of each stack to align the respective sheets of said stack and to transmit pull from one sheet to the next sheet for moving said sheets into an extended series, one of the sheets of each stack being a leading sheet as a stack is extended along said window, said sheets of each series bearing complemental sections of said chart to be displayed when said sheets of a selected stack in series are extended from said magazine to said window, a traveling element at said magazine adapted to move along said frame and along said window, normally releasable connection elements between said traveling element and the respective leading sheets, a coil spring compressed in the frame at said magazine and urging said traveling element to move along said window, a catch device to arrest said spring compressed so as to prevent the moving of said traveling element, and a selector device manipulable to selectively engage selected connection elements between said traveling element and a selected leading sheet and simultaneously to release said catch device so as to permit the moving of said traveling element with said selected leading sheet to spread the section sheets of the selected stack along said window.

10. The structure defined in claim 9, wherein said connecting elements comprise a series of fingers in staggered engagement on said traveling element and a corresponding registering series of finger engaging elements on the respective adjacent leading sheets, said selector device selectively engaging one of said fingers with the registering finger engaging element of the leading sheet of the selected stack.

11. The structure defined in claim 9, wherein said connecting elements comprise a series of fingers in staggered engagement on said traveling element and a corresponding registering series of finger engaging elements on the respective adjacent leading sheets, said selector device selectively engaging one of said fingers with the registering finger engaging element of the leading sheet of the selected stack, and a guide for each leading sheet along said window.

References Cited in the file of this patent
UNITED STATES PATENTS

| | | |
|---|---|---|
| 595,129 | Neuner | Dec. 7, 1897 |
| 1,100,925 | Sponsel | June 23, 1914 |
| 1,757,379 | Mead | May 6, 1930 |
| 2,141,398 | Lowenstein | Dec. 27, 1938 |